T. E. MURRAY.
METHOD OF ELECTRICAL WELDING.
APPLICATION FILED FEB. 18, 1916.

1,186,222.

Patented June 6, 1916.

Inventor
Thomas E. Murray
By his Attorney

UNITED STATES PATENT OFFICE.

THOMAS E. MURRAY, OF NEW YORK, N. Y.

METHOD OF ELECTRICAL WELDING.

1,186,222.  Specification of Letters Patent.  Patented June 6, 1916.

Application filed February 18, 1916. Serial No. 79,051.

*To all whom it may concern:*

Be it known that I, THOMAS E. MURRAY, a citizen of the United States, residing at New York, in the county of New York and State of New York, have invented a certain new and useful Improvement in Methods of Electrical Welding, of which the following is a specification.

The invention is a method for producing a circular tube from two longitudinal sections transversely curved, placed in registry and welded together. I herein show a specific application of my said method to the production of a vehicle hub of sheet metal formed in two facing sections and having around its periphery tubular projections of circular cross section, with the extremities of which projections the ends of tubular spokes of circular cross section will register and may be butt-welded thereto.

Figure 1:
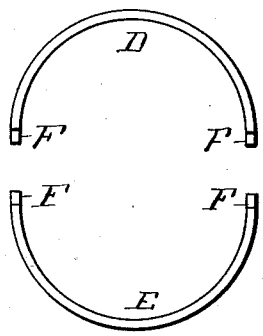
Figure 2:
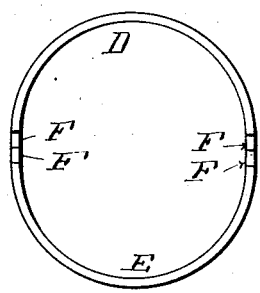
Figure 3:
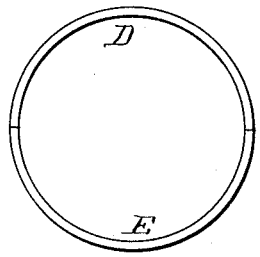
Figure 4:
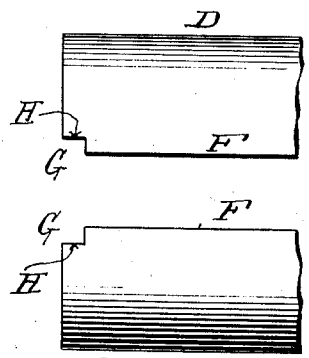
Figure 5:
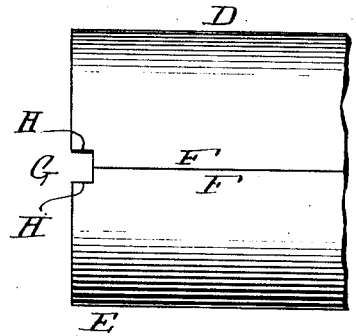
Figure 6:
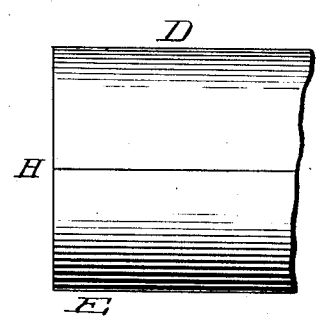
Figure 7:
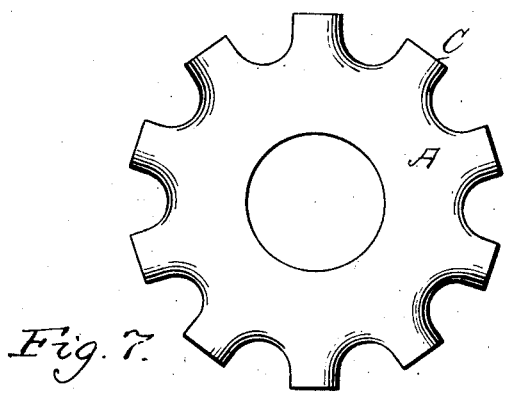
Figure 8:
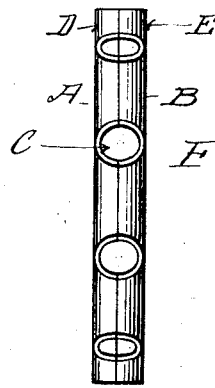

In the accompanying drawings Figure 1 is an end view of a spoke-receiving projection on a two part metal hub embodying my invention, and said parts being separated. Fig. 2 shows the said parts in contact before passage of the welding current. Fig. 3 shows the said parts after welding. Figs. 4, 5 and 6 are side views of the said projection corresponding respectively to Figs. 1, 2 and 3. Fig. 7 is a plan view of a metal hub having a plurality of said projections around its circumference. Fig. 8 is an edge view of said hub, showing its two facing sections welded together.

Similar letters of reference indicate like parts.

The hub, Figs. 7 and 8, which is a product of my method, is formed of two like sections A, B, each stamped out of sheet metal. These two sections are placed together, as shown in Fig. 8, with their edges registering. Said sections are pressed together and a welding current is caused to traverse the joint between said edges. Tubular projections C are thus formed around the hub periphery, to the extremities of which the ends of the spokes are afterward butt-welded.

I have found in practice that where the two parts D, E of each projection C are formed truly semi-circular, the fusing of the metal at the joint between said parts results in the completed tubular projection not being truly circular in cross section, so that a tubular spoke previously made truly circular will not correctly register therewith. I avoid this difficulty in the following way: Instead of forming the hub section so that each part of the projections shall be semi-circular, I form said part of a projection so that it shall have its middle portion semi-circular, and so that on the longitudinal edge of each semi-circular portion there shall be an extension, as shown at F. These extensions do not go to the extremity of the projection, but terminate at a short distance from said end, as shown at G, Figs. 4 and 5. When the sections of the hub are placed in contact, as shown in Figs. 2 and 5, the edges of the extensions F meet. When the welding current passes, the metal of these extensions becomes fused, and under the usual pressure exerted at the welding joint, the fused metal is displaced until the truly semi-circular middle portions of the projection come together, when the operation is arrested. The resulting complete projection is truly circular at its extremity. The coming together of the middle semi-circular portions is visibly indicated by the coming together of the edges H beyond the extensions F, and these edges being meanwhile separated by an air gap are comparatively cool, and so not welded together when they meet. This slight separation is of no consequence, as the space becomes filled with the fused metal when the spoke is butt-welded to the extremity of the projection.

While I have here illustrated my method as applied to the production of a hub having projections to which previously formed tubular spokes are butt-welded, it is obvious that said method is applicable to any case in which a previously formed tube of circular cross section is to be united to another tube made of two longitudinal sections, which after being welded together are required to have a truly circular cross section to enable the extremity of said tube to register with the end of said first-named tube.

I claim:

The method of producing a circular tube from two longitudinal sections placed in registry and welded together, which consists in first forming said longitudinal sections so that each comprises a semi-circular middle portion and at each longitudinal edge thereof an extension beyond said semi-circular portion, the said extensions being of equal width and terminating at a short distance from one end of each section, second, placing said extensions in registry and supplying welding current to the joint and pressing said extensions together until by the fusion of the metal of said extensions the semi-circular portions of said tube become approximated and united to form a tube of circular cross section.

In testimony whereof I have affixed my signature in presence of two witnesses.

THOMAS E. MURRAY.

Witnesses:
GERTRUDE T. PORTER,
MAY T. McGARRY.